United States Patent
Lin et al.

(10) Patent No.: US 7,565,071 B2
(45) Date of Patent: Jul. 21, 2009

(54) METERING METHOD OF AUTOMATIC EXPOSURE

(75) Inventors: Chin-Chih Lin, Taipei (TW);
Jui-Hsiang Lo, Taipei (TW);
Chiou-Shann Fuh, Shulin (TW);
Yun-Sian Jhu, Kaohsiung (TW)

(73) Assignee: Primax Electronics Ltd., Taipei (TW)

( * ) Notice: Subject to any disclaimer, the term of this patent is extended or adjusted under 35 U.S.C. 154(b) by 394 days.

(21) Appl. No.: 11/330,983

(22) Filed: Jan. 12, 2006

(65) Prior Publication Data

US 2007/0160357 A1 Jul. 12, 2007

(51) Int. Cl.
*G03B 3/10* (2006.01)
*G03B 13/34* (2006.01)
(52) U.S. Cl. .................. 396/121; 348/362
(58) Field of Classification Search ............ 396/63, 396/65, 89, 121, 123, 213, 233, 234; 348/208.12, 348/221.1, 362, 363; 356/222; 382/255
See application file for complete search history.

(56) References Cited

U.S. PATENT DOCUMENTS 7,132,634 B2 * 11/2006 Yoshida et al. ........... 250/201.7
2004/0169767 A1 * 9/2004 Norita et al. .............. 348/350

* cited by examiner

*Primary Examiner*—Melissa J Koval
*Assistant Examiner*—Autumn Parker
(74) *Attorney, Agent, or Firm*—Kirton & McConkie; Evan R. Witt

(57) ABSTRACT

This invention provides a metering method of automatic exposure for determining an exposure value of a picture having a subject, including a subject detecting step that uses focus values of the picture to detect the subject, and an exposure value calculating step that uses an auto exposure metering function to calculate an exposure value of the picture. The present invention can provide a simpler and smaller metering method.

5 Claims, 9 Drawing Sheets

METERING METHOD OF AUTOMATIC EXPOSURE

FIELD OF THE INVENTION

The present invention relates to a metering method of automatic exposure used for a digital still camera.

BACKGROUND OF THE INVENTION

Automatic exposure (AE), automatic white balance (AWB), and automatic focus (AF), called 3A, are the three important techniques used in digital still camera (DSC) systems. AE controls the amount of light reaching a sensor and prevents overexposure and underexposure.

The objective of AE is to achieve a good balance of exposure in an image. AE contains a metering algorithm and an exposure control.

First, the metering algorithm estimates the amount of incident light on the sensor and calculates an appropriate exposure value (EV). Later in hardware control, the exposure control adjusts three related devices, an aperture diameter, a shutter speed, and a sensor sensitivity based on the exposure value.

When the incident light increases, the image is over-exposed and exposure control should decrease the aperture diameter, increase shutter speed, or decrease sensor sensitivity. Oppositely, when the incident light decreases, the image is underexposed and the exposure control increases aperture diameter, decreases shutter speed, or increases the sensor sensitivity. Automatic exposure control means estimating the amount of incident light and automatically adjusting the exposure control.

Automatic Multi-Pattern (AMP) is one of the AE metering methods of Nikon. AMP uses a lookup table and chooses a better AE metering algorithm based on several conditions.

The general AE metering algorithms have their advantages in different scenes, so we can not adapt a metering algorithm for all scenes. For example, center-weighted metering always is used when a subject is centrally located in center, spot metering is used in backlit scenes, and average metering is used in landscape scenes where an object is far away.

AMP solves this problem by deciding a suitable AE metering algorithm for each different scene. In AMP, they construct a lookup table based on a visual assessment of tens of thousands of pictures, computer analysis of the relationship between brightness patterns, optimum contrast, human evaluation, and so on. Therefore, the performance in most kinds of scenes would achieve a good result on average.

Another AE metering algorithm is disclosed by C. C. Yu in "Automatic Exposure with Fuzzy Control," Master Thesis, Department of Computer Science and Information Engineering, National Taiwan University, 2004.

C. C. Yu describes two problems for AMP:

(1). A smooth transition is needed between each scene classification.

(2). A subject is not always in the central region.

In the AMP method, the subject is assumed to be in the center region. In photography, the subject may not always be located in the exact center, but the subject will be located in the center near the left, right, top, or bottom. Moreover, if the center region also includes other insignificant information, the subject information will be diluted. Subject information is very important in scene classification of AMP. If the subject is not located in the center, we will take the wrong pictures naturally. C. C. Yu's "Subject Growing" solves this problem.

In C. C. Yu's solution, it assumes the subject always crosses the center region, and it sets the gray region as the initial subject, shown in FIG. 1.

After initialization, C. C. Yu extends the subject with the new regions, adjoining gray region, by considering the following conditions of the new region and the subject region:

(1) The difference of luminance is less than 2.0 LV.

(2) The difference of hue is less than 30 degrees.

(3) The saturation of the new region is more than 0.5.

If the new region conforms to the three conditions, a program sets it as the subject region. In the end of subject growing, if the number of detected subject regions is less than 6 or more than 20, the subject is defined as the default setting as the gray regions in FIG. 2.

After the subject growing process, more precise subject regions are obtained and are used to calculate the contrast between the subject and the background for use with a multi-reference table later.

In real life, the light source is unstable and changing all the time. When the measured light intensity is just near the threshold between two weather or contrast conditions, AMP metering system will change the metering algorithms with the changing light. If the change is fast, we will see the display screen is flickering, and can feel uncomfortable.

Fuzzy control is the mechanism that simulates the undefined regions between the defined regions. It helps to smooth the transition between each condition. C. C. Yu uses fuzzy control to smoothly transition between different weather, contrast, and subject conditions.

Obviously, the subject growing process increases the probability to guess the correct subject location, and uses the subject information for more precise metering. However, the result of subject growing is not always correct. If the subject growing process finds a wrong subject region, the metering algorithm will use the wrong information to take flawed pictures.

Another issue from AE is Bracket Exposure. Bracketing is a technique used to take a series of images of the same scene at a variety of different exposures that "bracket" the metered exposure. In a general AE bracketing method, the camera will automatically take 3 or 5 frames with exposure settings between 0.3 and 2.0 EV differences. It is useful when users are not sure exactly how the image will turn out or are worried that the scene has a wide dynamic range.

When we take pictures using AE bracketing, we next select our favorite one from bracketing pictures. An optimal exposure selector (OES) objectively selects one favorite picture from AE bracketing pictures, which differ in exposure only. About the benefits, OES saves the effort that users need to select a favorite picture, and saves the memory space that bracketing pictures would occupy.

To select the favorite picture, researchers analyze the factors of person perceptions, such as brightness, contrast, and colorfulness.

In decision making, the prior art OES analyzes the factors that are related to the person perception and are influenced by exposure control. The following three factors are considered:

1. Intensity Mean

Intuitively, the light intensity factor is the most related to exposure control. In implementation, we take the mean of light intensity to judge the quality. The larger of the mean, the bright the picture is.

2. Standard Deviation and Entropy

Besides the light intensity factor, C. C. Yu also considers the contrast factor. Different exposure controls will result in the different contrasts, and people prefer the high-contrast picture. To analyze this factor, he calculates the standard deviation and entropy of a histogram. The larger the standard deviation, the wider the distribution of the histogram, thus the higher the contrast. The larger the entropy, the more uniform the histogram.

3. Colorfulness

People like colorful images. In application, C. C. Yu thinks colorfulness as the distance from the pixel to an origin point in CbCr coordinates. The smaller the distance, the grayer the pixel is.

However, the matching ratio (i.e., selecting the right picture) of the prior art OES is not good enough.

SUMMARY OF THE INVENTION

It is an object of the present invention to provide a metering method of automatic exposure, which is simpler and smaller than the disclosed prior art.

In accordance with an aspect of the present invention, there is provided a metering method of automatic exposure for determining an exposure value of a picture having a subject, comprising a subject detecting step comprising using focus values of the picture to detect the subject, and an exposure value calculating step comprising using an auto exposure metering function to calculate an exposure value of the picture.

The subject detecting step comprising finding out ten segments which have maximum focus values; calculating numbers representative of the segments which contain maximum focus values in a left region, a center region, and a right region of the picture (l, c, r, respectively); and determining a location of the subject. The subject is in the center region, if c>4, or ((c>l) and (c>r)). The subject is in the left region, if the subject is not in the center region and (l>c) and (l>r). The subject is in the right region, if the subject is not in the center region and (r>c) and (r>l).

The exposure value calculating step comprising calculating an average luminance of the regions; sorting the luminance of the regions and calculating a Contrast-Ratio; finding interesting regions; and calculating the exposure value according to the equation:

Exposure value=(1−Contrast_Ratio)×subject+
Contrast_Ratio×interesting regions.

The Contrast_Ratio is obtained according to a Contrast Ratio function; wherein the Contrast Ratio function determines the Contrast_Ratio by a contrast value, which is obtained by subtracting a minimum luminance among the regions from a maximum luminance among the regions. If the luminance of the subject region is close to the maximum luminance, the interesting region is a bright region. If the luminance of the subject region is close to the minimum luminance, the interesting region is a dark region.

This invention also provides an optimal exposure selecting method of bracket exposure, for selecting an optimal exposure picture having an optimal exposure value among a plurality of pictures having the same scene as the picture but having different exposure values, wherein the method selects the optimal exposure picture according to at least two factors: image details and ratio of non-saturating pixels.

The above objects and advantages of the present invention will become more readily apparent to those ordinarily skilled in the art after reviewing the following detailed description and accompanying drawings, in which:

BRIEF DESCRIPTION OF THE DRAWINGS

FIG. 5(*b*) shows a right region of a DSC sensor of this invention;

FIG. 5(*c*) shows a left region of a DSC sensor of this invention;

FIG. 8(*b*) shows an exposure result using the method of this invention.

FIG. 9(*b*) shows another exposure result using the method of this invention.

DETAILED DESCRIPTION OF THE PREFERRED EMBODIMENT

The present invention will now be described more specifically with reference to the following embodiments. It is to be noted that the following descriptions of the preferred embodiments of this invention are presented herein for the purpose of illustration and description only. It is not intended to be exhaustive or to be limited to the precise form disclosed.

The metering method of this invention contains two parts:
(1) Subject detection, and
(2) Exposure value calculation based on an AE metering function Subject detection is different from subject growing and does not set the center as the subject region. We consider the focus information to decide whether the subject is in the center, the left, or the right. Moreover, we propose a new AE metering function to replace the AMP table. Without looking up the table and saving the table, the new AE metering function is simple and small.

Figure 1:
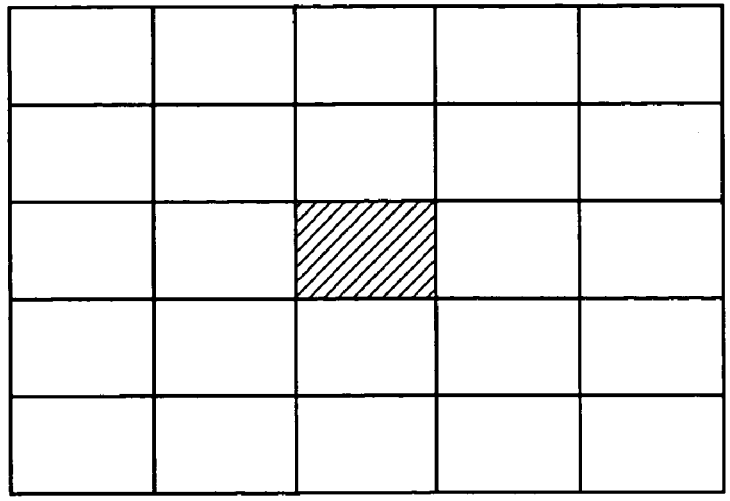
FIG. 1 schematically illustrates a gray center region of C. C. Yu.
Figure 2:
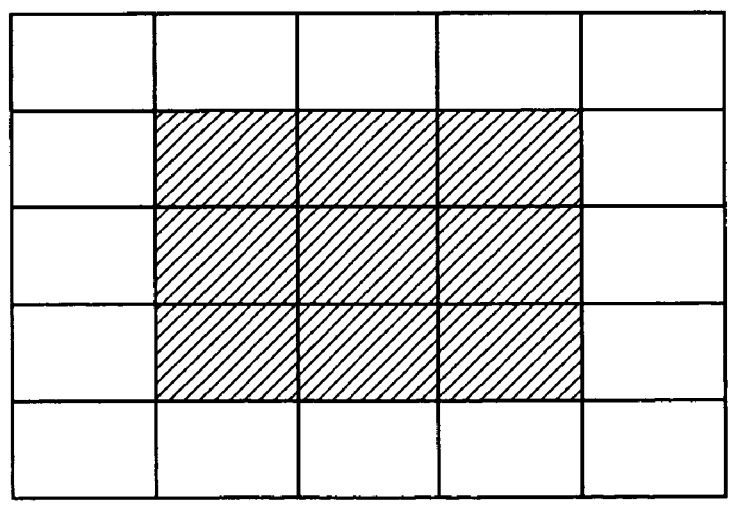
FIG. 2 schematically illustrates gray regions of C. C. Yu's default subject.
Figure 3:
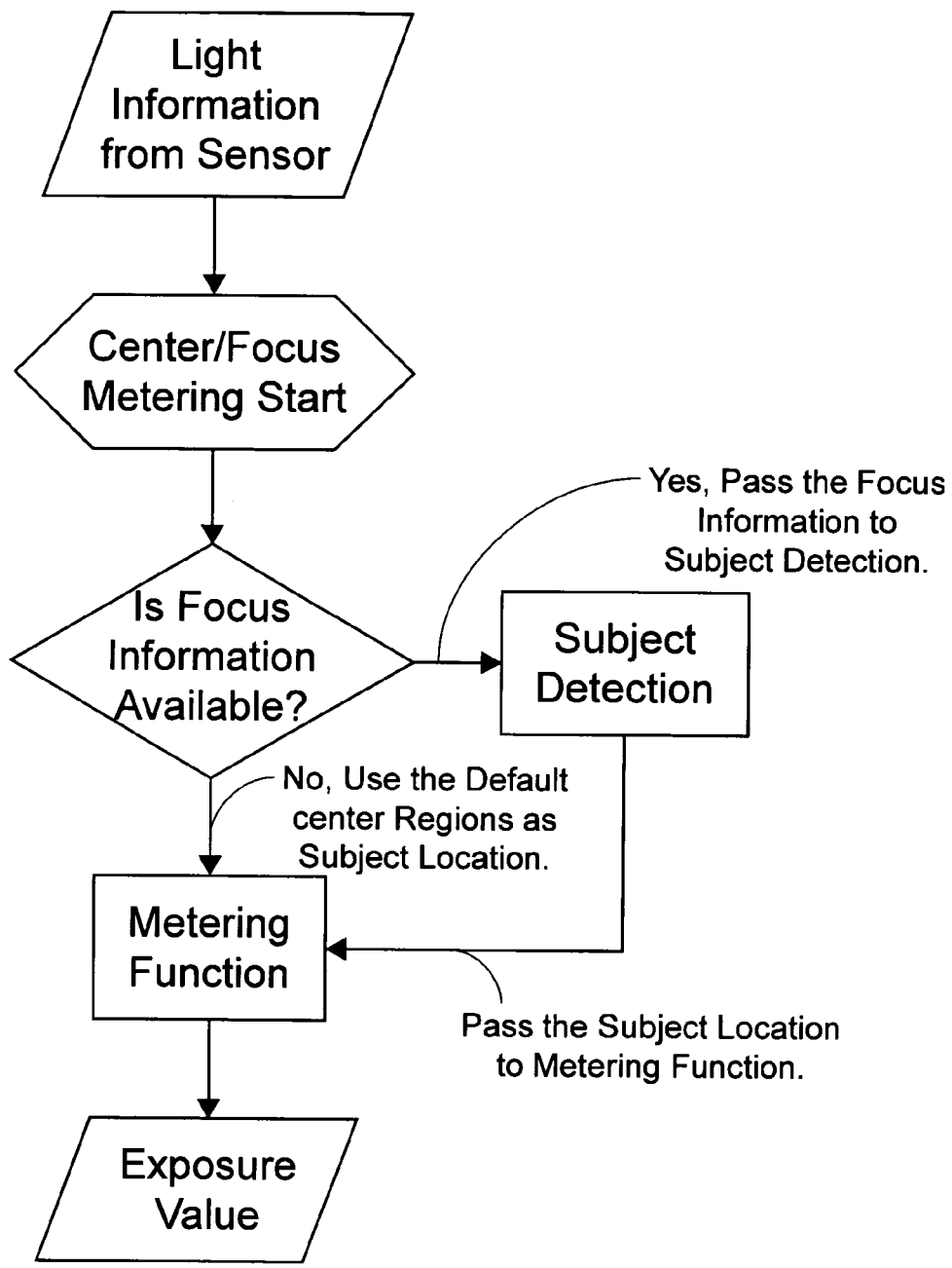
FIG. 3 is a flowchart of a metering method of the invention.

FIG. 3 is the flowchart of the metering method of the invention. First, light information from a sensor of a DSC is received and checked to determine if the focus information is available or not. If the focus information is available, we use subject detection to choose the subject region, otherwise, we use a default center region. Finally, with subject region, we calculate the EV by the new AE metering function.

In preview mode, AF will not work at the time to save the power, and focus information is not available. We use the center as the default subject and keep a reasonable exposure. In capture mode, AF works and focuses on the subject, we can detect the subject more precisely to take better pictures.

Figure 4:
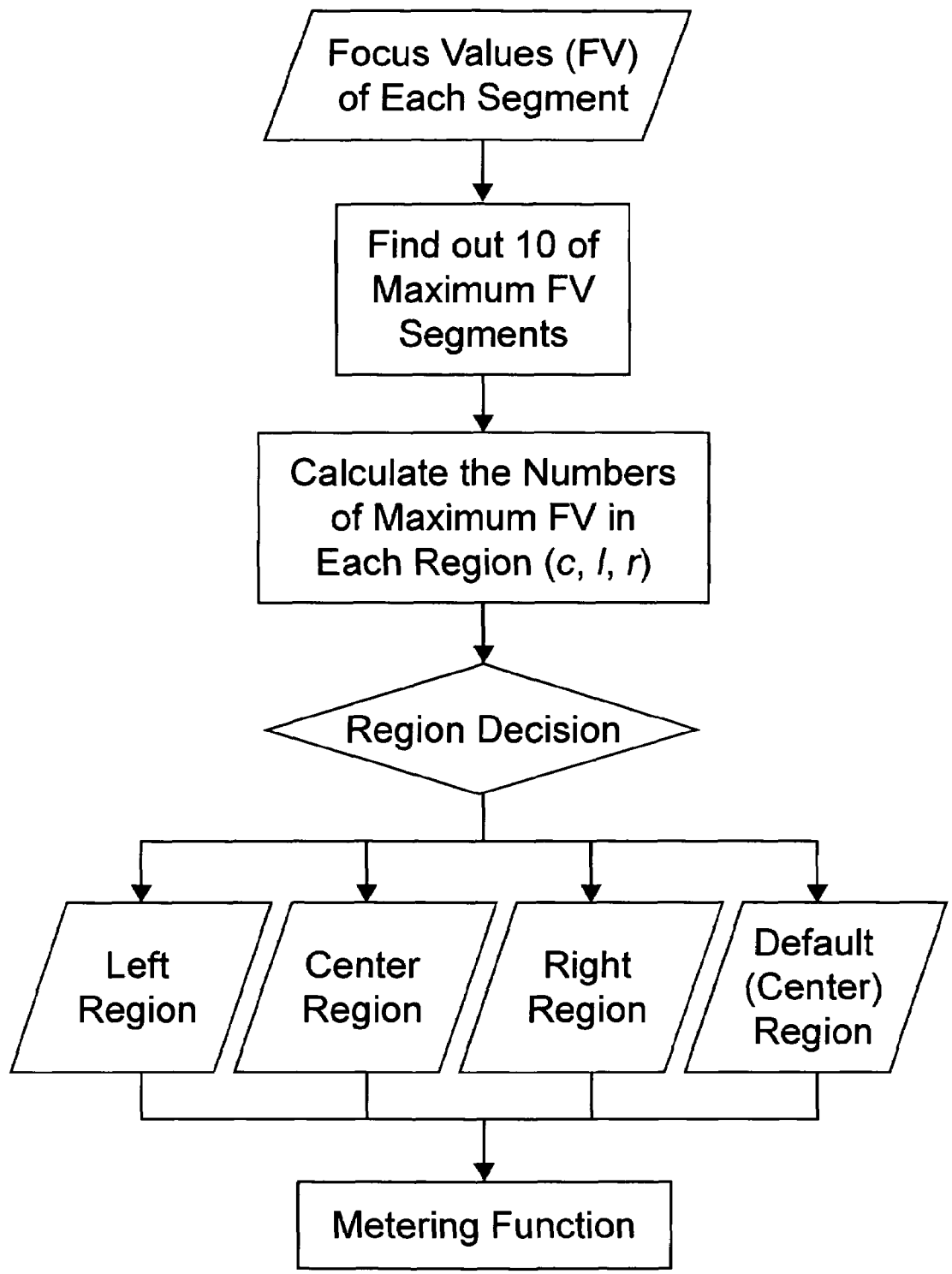
FIG. 4 shows a flowchart of a subject detection step of this invention.
Figure 5A:
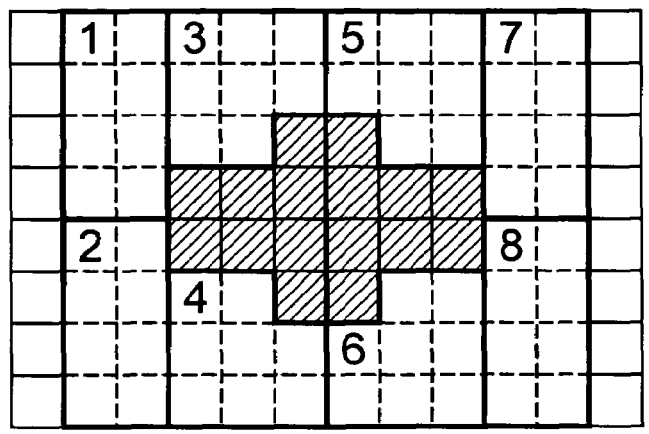
FIG. 5(*a*) shows a center region of a DSC sensor of this invention.
Figure 5B:
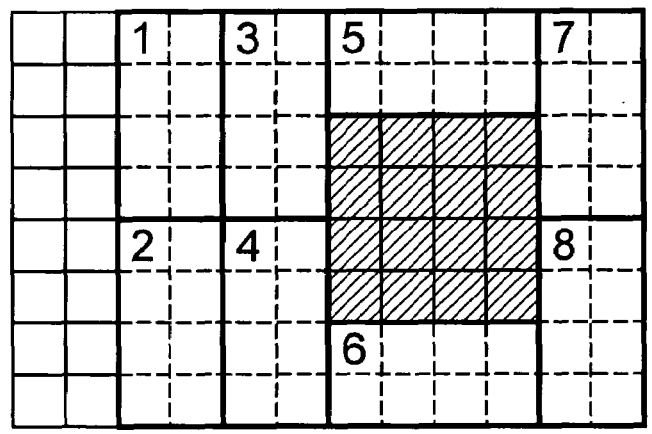
Figure 5C:
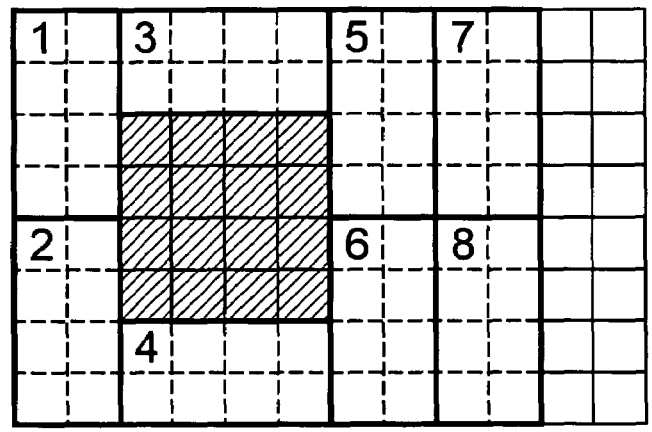

Without the subject growing process and guessing the subject is always in the center, we use the focus information, if available, to detect subject location. Because the AF focuses on the subject with high probability, we optimize the exposure quality of subject region, containing a high focus value. Even if the AF does not focus on the correct subject, the focused region is still clearer than others, and it is reasonable to optimize exposure quality for clear regions. FIG. 4 shows the flowchart of the subject detection step of this invention. The sensor of a DSC is defined as regions 1-8 and classified as a center region, a right region, and a left region. FIG. 5(a) shows the center region of sensor. FIG. 5(b) shows the right region of the sensor. FIG. 5(c) shows the left region of the sensor.

First, we get the focus values of each segment from the AF. Focus value represents the levels of high frequency in the segments, and a high focus value means a high frequency and a clear region. We select ten segments, which contain maximum focus values and their light intensities are less than a luminance threshold. Next, we calculate the numbers of maximum segments in each region (c, l, r). FIG. 4 shows three gray regions of possible subject locations. The rules of region decision are:

(1) Center region: (c>4) or ((c>l) and (c>r)).
(2) Left region: center condition fails and (l>c) and (l>r).
(3) Right region: center condition fails and (r>c) and (r>l).
(4) Default region: otherwise.

The rules of region decision consider three cases:

(1) The center region still has the highest probability to contain the subject. We detect left or right regions only when the center region has poor focus and light intensity.
(2) The right or left region needs rigorous condition to be the subject. It should contain more focus regions than others and the center fails in Case one.
(3) If the above conditions both fail, then we choose the center as the subject region.

Finally, the subject detection process passes subject region information to the AE metering function.

Figure 6:
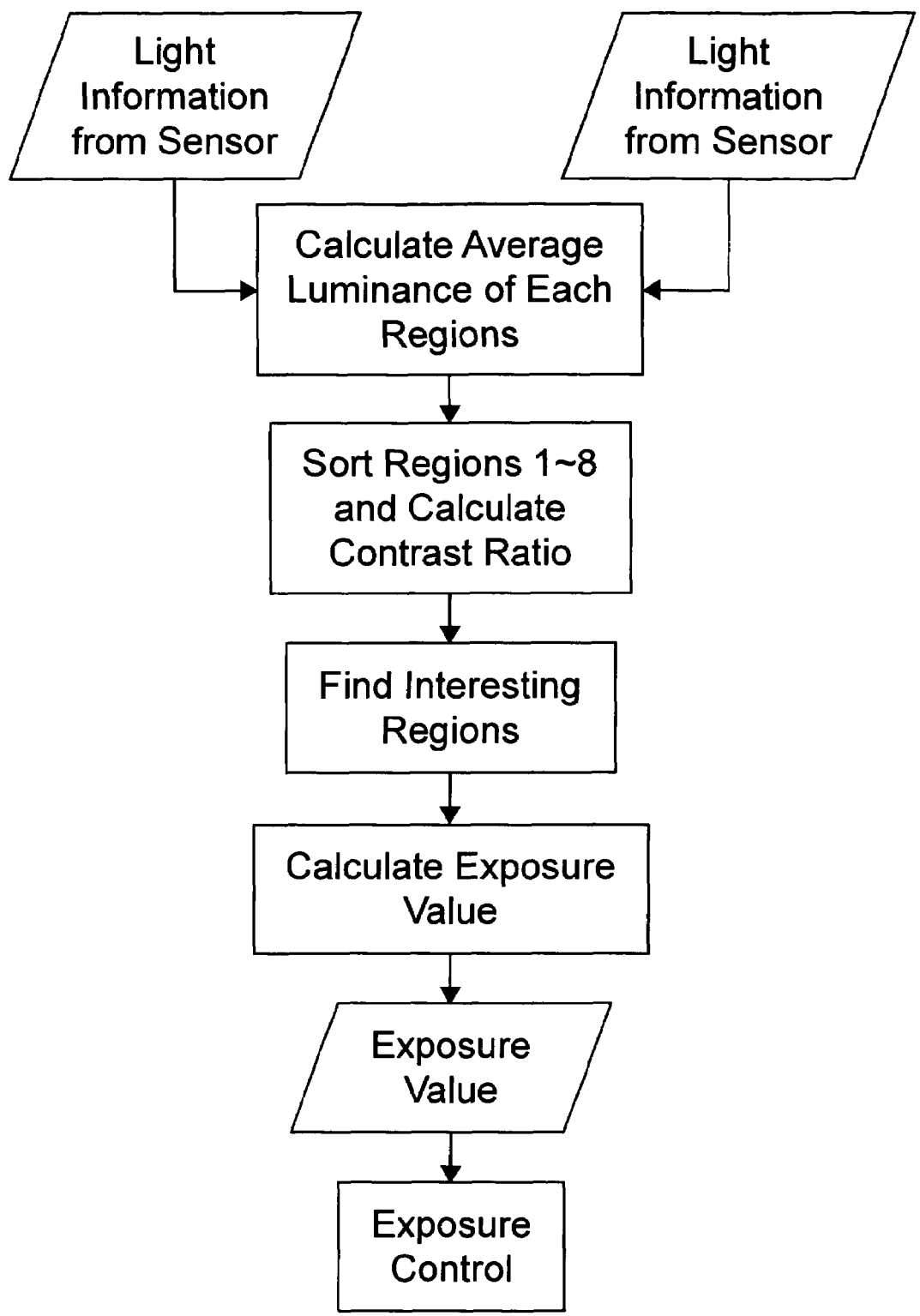
FIG. 6 shows a flowchart of using an AE metering function of this invention to calculate an exposure value.
Figure 7:
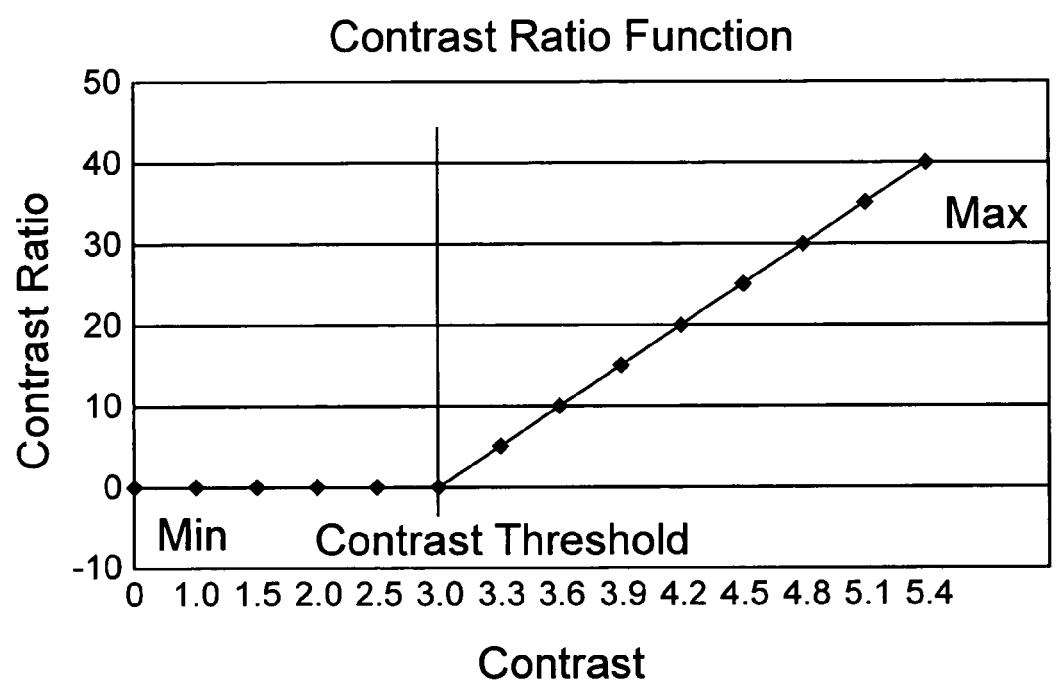
FIG. 7 is a transformation between Contrast and Contrast_Ratio of this invention.

FIG. 6 clearly shows the flowchart of using an AE metering function to calculate an exposure value. First, light information and the subject region are obtained to calculate average luminance of each region. As in FIG. 5, for different subject regions, the AE metering function calculates different Regions 1-8 and the subject region. Second, it sorts regions 1-8 and calculates the contrast by subtracting the min. region from the max. region. The contrast ratio is calculated by the transformation shown in FIG. 7. Contrast is concerned when it is larger than a contrast threshold (3LV), and maximum contrast ratio is 40% to protect the importance of the subject information.

If the contrast is larger than the contrast threshold, we find the interesting regions depending on the order of the subject region in sorted regions. If the subject region is close to the maximum part, we take the bright region as the interesting region. Otherwise, if the subject region is close to the minimum part, we take the dark region as the interesting region. Finally, with the value of the subject, the contrast ratio, the interesting region, and cut process, the AE metering function calculates the exposure by the Equation:

Exposure value=(1−Contrast_Ratio)×subject+ Contrast_Ratio×interesting regions.

Figure 8A:
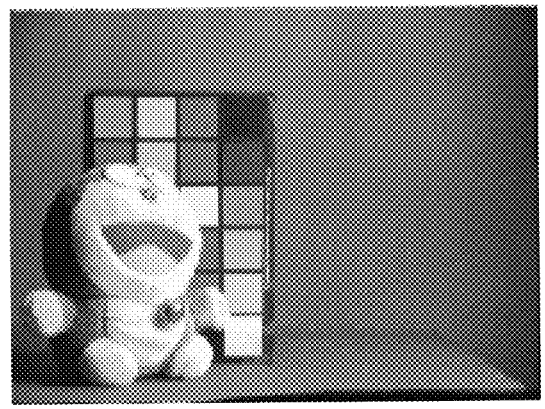
FIG. 8(*a*) shows an exposure result using a prior art method.
Figure 8A:
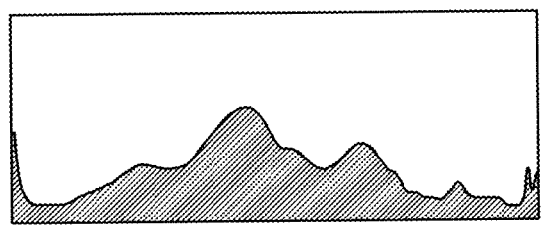
Figure 8B:
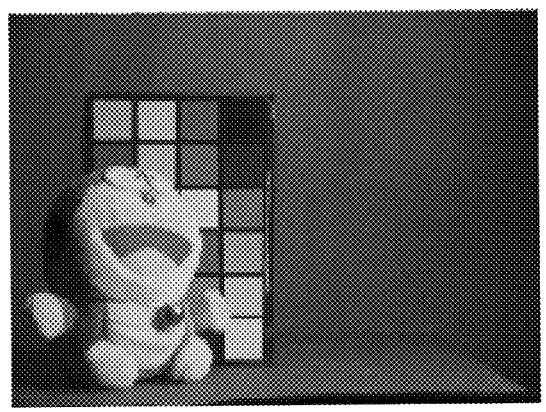
Figure 8B:
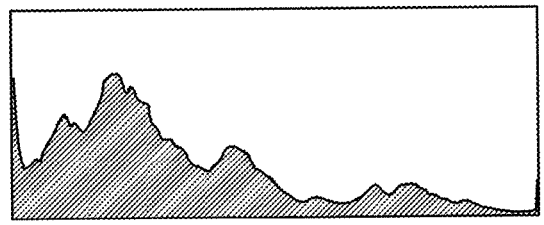

FIG. 8(a) shows the exposure result using a prior art method and FIG. 8(b) shows the result using the method of this invention. In FIG. 8, the subject is not in the center. It is obvious that without focus information (FIG. 8(a)), the prior art method emphasizes the center region and overexposes the subject. With focus information (FIG. 8(b)), the subject is emphasized correctly and has a better exposure result.

Figure 9A:
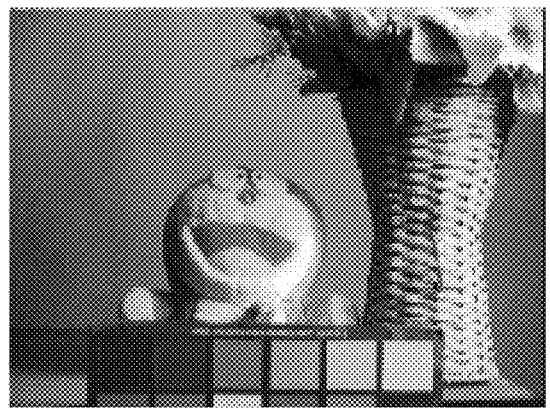
FIG. 9(*a*) shows another exposure result using a prior art method.
Figure 9A:
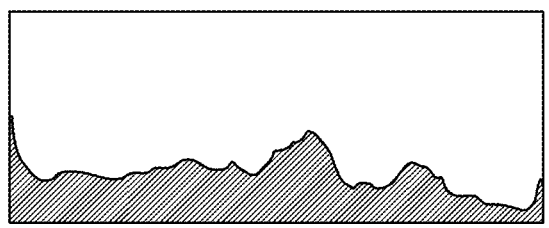
Figure 9B:
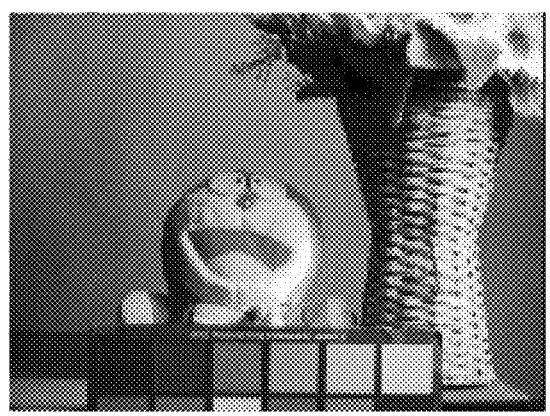
Figure 9B:
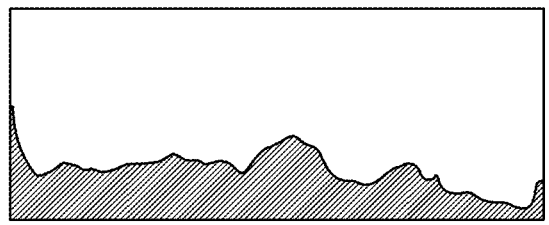

FIG. 9(a) shows another exposure result using the prior art method and FIG. 9(b) shows the result using the method of this invention. In FIG. 9, the subject is in the center, but the left or the right region has a high contrast object, which has high focus values. We see that with focus information, subject detection still does not lose the subject, even if the left object has higher frequency regions.

In AE bracketing, we use the subject detection process of this invention as described above and modify the factors of OES for more precise selection.

1. Intensity Means

Intensity means of subject and global are still important factors and directly represent the AE performance. We emphasize the intensity mean as prior art OES.

2. Intensity Standard Deviation and Entropy

Intensity standard deviation represents the contrast of pictures, and the higher the contrast, the more people prefer the picture. In fact, by the observation from histograms of pictures, different exposure has little effect on the standard deviation of a histogram. People do not prefer the scenes with highest standard deviation, because other factors are more important. We still consider the standard deviations of subject and global, but we give them less weight in overall consideration.

3. Colorfulness

Most people like colorful pictures, but the relationship between colorfulness and the exposure setting is less, so we give colorfulness less weight in overall consideration.

4. Detail

Figure 10A:
FIG. 10 shows bracketing images.
Figure 10B:
Figure 10C:
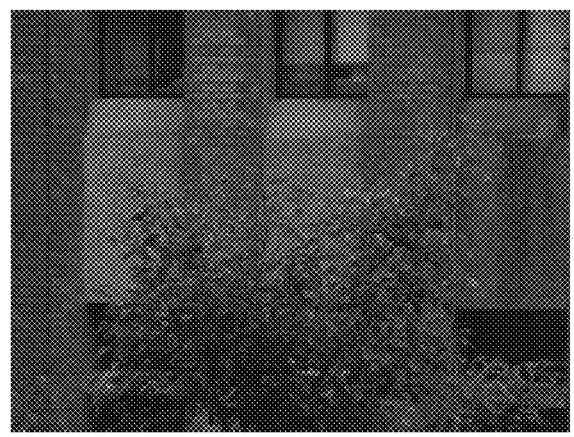

One of the important purposes in the AE metering method of this invention is to show as much detail as possible. The detail factor is not considered in the prior art OES, but we can show the importance of details from FIG. 10. FIGS. 10a-10c illustrate the bracketing of images. FIG. 10(a) has higher scores in light intensity, but the details are less than FIG. 10(b). People prefer 10(b) because the details are clear. We consider the detail factor to be important, therefore we give it a score of 10 at most.

5. Non-Saturating Ratio

Besides the light intensity and detail considerations, another important purpose of AE is to prevent image underexposure or overexposure. In other words, the number of saturating pixels should not be many, so the ratio of non-saturating pixels is another important factor in exposure selection.

We took 30 sets of AE bracketing pictures from a Sony F828 and a Fujifilm F601. The image sets contain outdoor scenes, indoor scemes, landscape scenes, portraits, and so on. Table I show the matching ratio of the OES factors of this invention and C. C. Yu's results.

TABLE I

| Item | Matching | Mismatching | Ratio |
| --- | --- | --- | --- |
| Intensity Mean | 24 | 6 | 80% |
| Intensity St. Dev. | 10 | 20 | 33% |
| Colorfulness | 6 | 24 | 20% |
| Detail | 17 | 13 | 57% |
| Non-Saturating Ratio | 21 | 9 | 70% |
| New OES Result | 26 | 4 | 87% |
| C.C. Yu's OES Result | 19 | 11 | 63% |

As shown in the experiments, the modified OES can select the better exposed pictures according to detail and the non-saturating ratio.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A metering method of automatic exposure for determining an exposure value of a picture having a subject, comprising:

a subject detecting step comprising using focus values of the picture to detect the subject and passing subject region information to an automatic exposure metering function; and an exposure value calculating step comprising having the auto exposure metering function use the subject region information to calculate an exposure value of the picture, wherein the exposure value calculating step comprises:

calculating an average luminance of a left region, a center region, and a right region;

sorting the luminance of the left, center, and right regions and calculating a Contrast_Ratio;

finding interesting regions; and calculating the exposure value according to the equation:

Exposure value=(1−Contrast_Ratio)×subject+ Contrast_Ratio×interesting regions.

2. The metering method of automatic exposure according to claim 1, wherein the picture comprises a plurality of segments and the subject detecting step further comprises:

selecting ten segments which have maximum focus values;

calculating numbers representative of the segments which contain maximum focus values in the left region, the center region and the right region (l, c, r, respectively) of the picture respectively; and determining the subject region information by determining a location of the subject.

3. The metering method of automatic exposure according to claim 2, wherein:

(1) the subject is in the center region, if $c>4$, or (($c>l$) and ($c>r$));

(2) the subject is in the left region, if the subject is not in the center region and ($l>c$) and ($l>r$); and (3) the subject is in the right region, if the subject is not in the center region and ($r>c$) and ($r>l$).

4. The metering method of automatic exposure according to claim 1, wherein the Contrast_Ratio is obtained according to a Contrast Ratio function; wherein the Contrast Ratio function determines the Contrast_Ratio by a contrast value which is obtained by subtracting a minimum luminance among the regions from a maximum luminance among the regions.

5. The metering method of automatic exposure according to claim 4, wherein:

if the luminance of the subject region is close to the maximum luminance, the interesting region is a bright region;

if the luminance of the subject region is close to the minimum luminance, the interesting region is a dark region.

* * * * *